July 19, 1966 W. T. REUSCHER 3,262,030
ELECTRICAL SEMICONDUCTOR DEVICE
Filed July 16, 1963

INVENTOR
WERNER T. REUSCHER
BY Percy P. Lantzy
ATTORNEY 3,262,030
Patented July 19, 1966

3,262,030

ELECTRICAL SEMICONDUCTOR DEVICE

Werner Theodor Reuscher, Nurnberg, Germany, assignor to International Standard Electric Corporation, New York, N.Y., a corporation of Delaware Filed July 16, 1963, Ser. No. 295,331
Claims priority, application Germany, July 27, 1962, St 19,531
2 Claims. (Cl. 317—234)

The invention relates to an electrical semiconductor device and particularly to an improved power rectifier arrangement with a semiconductor of germanium, silicon, an intermetallic alloy or the like.

In the prior art, conventional selenium rectifiers have been stacked by use of bolts or frames supporting the semiconductor elements between rectifier plates. In addition, metallic spacers and contacts have also been used as supports to accommodate silicon rectifiers having protective oxide coatings as described in copending application No. 281,873, filed May 21, 1963 and assigned to the same assignee as the instant application. In that case, a metal ring electrode was provided with one or several bores or recesses to accommodate the power rectifiers. The rectifiers were soldered to the bottom of the bores and could be electrically connected in series to the next adjacent stage through insulating material which separated the opposing electrodes. Another arrangement utilized a metal ring with a bore to accommodate the power rectifier, an insulating disk mounted on the open side of the metal ring and a metal layer applied to this insulating disk which was connected to the second electrode of the rectifier through the insulating disk.

The object of the present invention is to provide an improved form of the configuration described in the aforesaid application. In the instant arrangement the semiconductor device is accommodated in the cavity of an insulating ring covered on both sides by solid metal rings, which simultaneously serve as electrical leads to the semiconductor electrodes. The details of the invention will be more fully understood and other objects and advantages will become apparent in the following description and accompanying drawing, wherein FIGS. 1 to 3 represent various embodiments of the invention.

Figure 1:
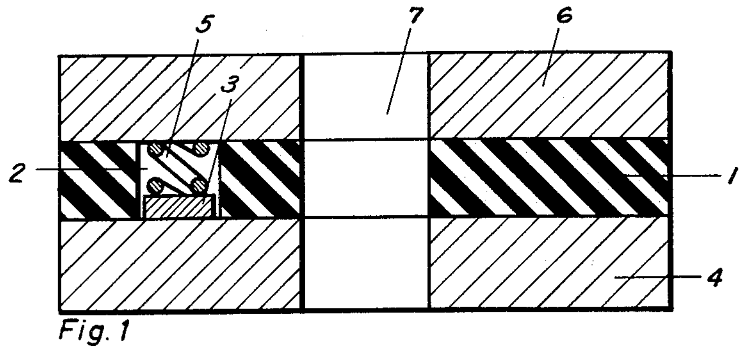

FIG. 1 shows an insulating ring 1 having an eccentric hole 2, so that the power rectifier 3 can be accommodated in the cavity. One electrode of the rectifier is connected electrically with the lower metallic ring 4 and the other electrode by a spring 5 or other suitable connection, to the upper metal ring 6. The insulating ring 1 and the metal rings 4 and 6 have aligned central holes 7, through which an insulating supporting bolt can be inserted to permit stacking of several similar elements.

The rings 1, 4, and 6 can be tightly secured with each other by suitable methods so that they form a unitary structure. For example, the insulating ring 1 may consist of ceramic material and the metal rings 1 and 4 can be soldered to metalized layers on the insulating ring 1.

Figure 2:
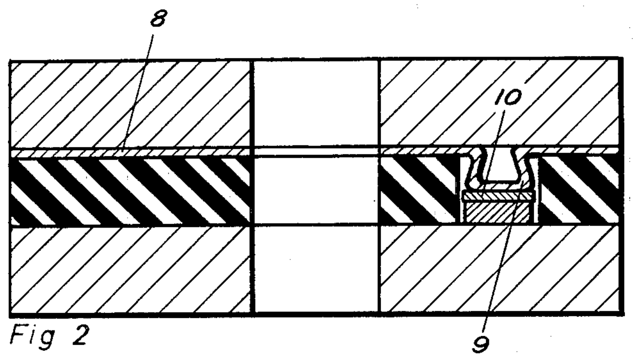
Figure 3:
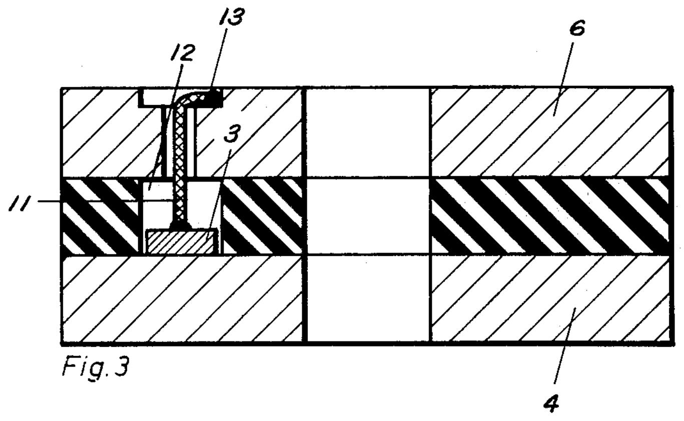

FIG. 2 differs from that of FIG. 1 by use of a metallic ring 8 provided with a reinforcing fin 9 instead of the spring 5, which makes contact with an electrode of the power rectifier. The ring 8 is preferably made of flexible metal. An intermediate member 10 provides pressure and tolerance for different sizes and consists, therefore, of a relatively soft metal.

FIG. 3 shows another form of the invention. The lead 11 is secured to one electrode of the power rectifier 3, with the other electrode soldered to the metal ring 4. Lead 11 passes through a channel 12 into the metal ring 6 and is soldered at point 13 where the channel expands, so that the soldering area is flush with the surface of ring 6.

As previously mentioned, it is thus possible to mount several power rectifiers in series on one support. In this manner any suitable number of cavities 2 in the insulating material ring 1 and if desired additional extended channels, may also be provided, to accommodate parallel rectifiers.

The invention is not limited to an annular arrangement and may take other similar forms such as shown in the aforementioned copending application. Also solid plates without central bores can be stacked by means of a frame, or other suitable supports. It is therefore apparent that many other variations may be made in the design and configuration without departing from the scope of the invention as set forth in the appended claims.

What is claimed is:

1. A semiconductor mounting structure, comprising:
an insulating ring having two holes therethrough, at least one of said holes being eccentric;
a pair of metal rings positioned on each side of said insulating ring, each of said metal rings having a hole therethrough in alignment with the other of said holes through said insulating ring, said metal rings being secured to said insulting ring as a unitary structure;
a semiconductor element having at least two electrodes positioned within said eccentric hole, one of said electrodes being directly secured to one of said metal rings and the other electrode being connected to the other metal ring; and
an insulated mounting bolt through said aligned holes.

2. The device of claim 1 wherein a plurality of series connected semiconductor elements and mounting structures are stacked on said bolt.

References Cited by the Examiner

UNITED STATES PATENTS

| | | | |
|---|---|---|---|
| 2,861,227 | 11/1958 | Scherbaum | 317—234 |
| 2,956,214 | 10/1960 | Herbst | 317—234 |
| 2,986,679 | 5/1961 | Storsand | 317—234 |
| 3,001,113 | 9/1961 | Mueller | 317—236 |
| 3,030,557 | 4/1962 | Dermit | 317—234 |

FOREIGN PATENTS

| | | |
|---|---|---|
| 883,862 | 12/1961 | Great Britain. |

JOHN W. HUCKERT, *Primary Examiner.*
A. M. LESNIAK, *Assistant Examiner.*